(12) United States Patent  
Kim

(10) Patent No.: US 11,909,287 B2  
(45) Date of Patent: Feb. 20, 2024

(54) INSULATOR AND MOTOR COMPRISING SAME

(71) Applicant: LG INNOTEK CO., LTD., Seoul (KR)

(72) Inventor: Tae Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 555 days.

(21) Appl. No.: 17/259,664

(22) PCT Filed: Jul. 31, 2019

(86) PCT No.: PCT/KR2019/009513
§ 371 (c)(1),
(2) Date: Jan. 12, 2021

(87) PCT Pub. No.: WO2020/032463
PCT Pub. Date: Feb. 13, 2020

(65) Prior Publication Data
US 2021/0320547 A1    Oct. 14, 2021

(30) Foreign Application Priority Data
Aug. 10, 2018    (KR) .......................... 10-2018-0093499

(51) Int. Cl.
*H02K 3/52* (2006.01)
*H02K 3/32* (2006.01)

(52) U.S. Cl.
CPC ............. *H02K 3/522* (2013.01); *H02K 3/325* (2013.01); *H02K 2203/12* (2013.01)

(58) Field of Classification Search
CPC ..... H02K 3/325; H02K 3/522; H02K 2203/12
See application file for complete search history.

(56) References Cited

U.S. PATENT DOCUMENTS

2010/0194214 A1    8/2010    Takahashi et al.
2010/0264773 A1    10/2010    Hino et al.

FOREIGN PATENT DOCUMENTS

EP    0910152    4/1999
EP    910152 B1 *   9/2001    ............. H02K 3/522
(Continued)

OTHER PUBLICATIONS

European Search Report dated Mar. 28, 2022 issued in Application No. 19848116.0.
(Continued)

*Primary Examiner* — Jue Zhang
(74) *Attorney, Agent, or Firm* — KED & ASSOCIATES, LLP

(57) ABSTRACT

A motor has: a housing; a stator disposed inside the housing; a rotor disposed inside the stator; and a shaft coupled to the rotor. The stator has a stator core, an insulator disposed on the stator core, and a coil wound around the insulator. The insulator has: a first body; an inside guide protruding from the inside of the first body; an outside guide protruding from the outside of the first body; a first blade portion disposed to be spaced apart from one side of the first body and to protrude from the outside guide in the radial direction; a second blade portion disposed to be spaced apart from the other side of the first body and to protrude from the outside guide in the radial direction; and a protruding portion extending from one radial side of the first blade portion.

18 Claims, 17 Drawing Sheets

(56) References Cited

FOREIGN PATENT DOCUMENTS

| EP | 2677633 | 12/2013 |
| FR | 3033454 | 9/2016 |
| JP | 2010-051087 | 3/2010 |
| JP | 2010-141963 | 6/2010 |
| JP | 2012-244842 | 12/2012 |

OTHER PUBLICATIONS

International Search Report dated Nov. 5, 2019 issued in Application No. PCT/KR2019/009513.

* cited by examiner

[FIG. 1]
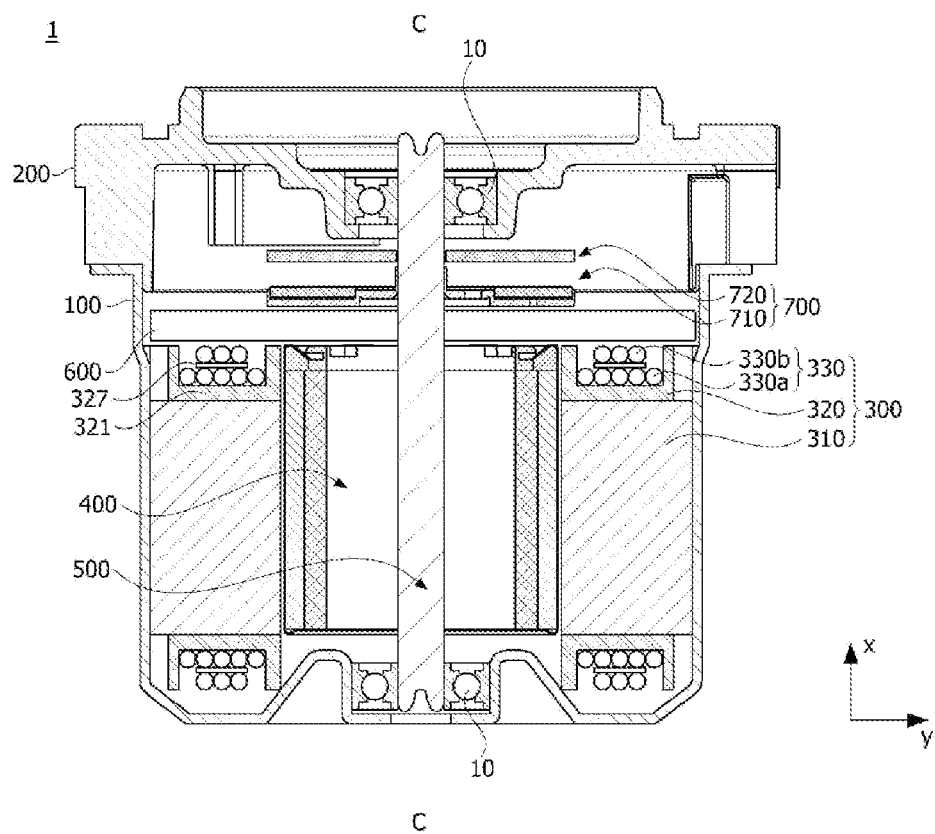

[FIG. 2]
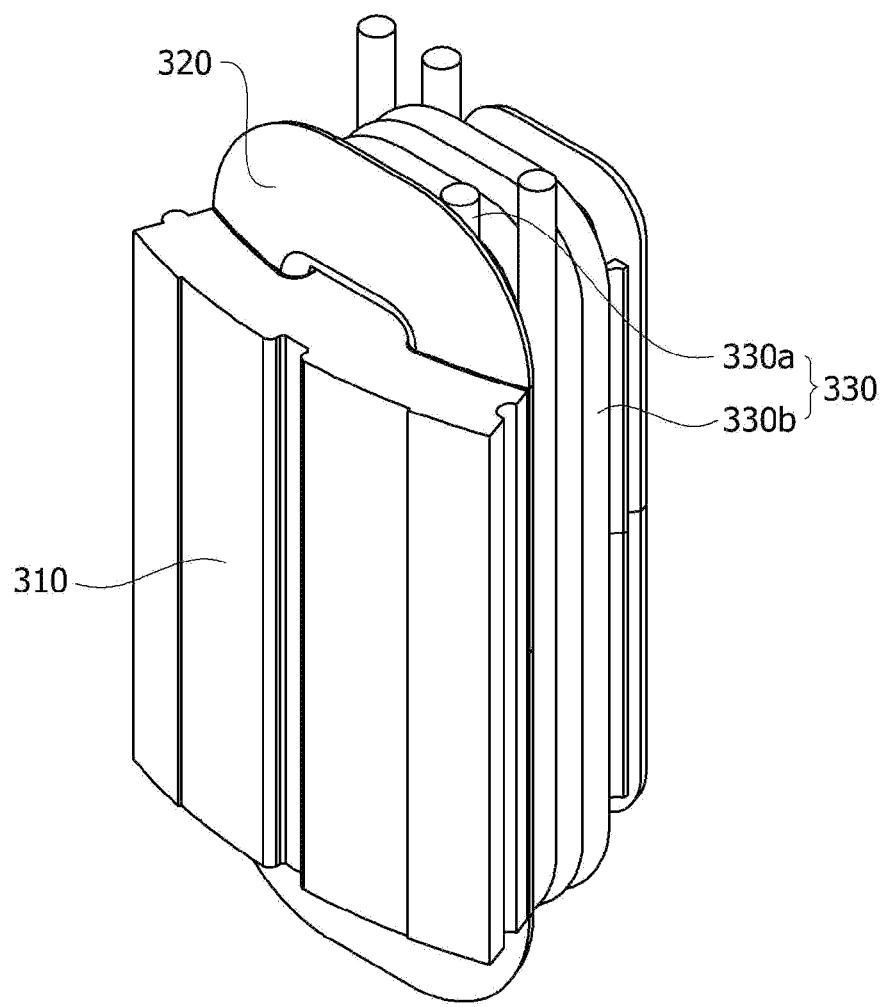

[FIG. 3]
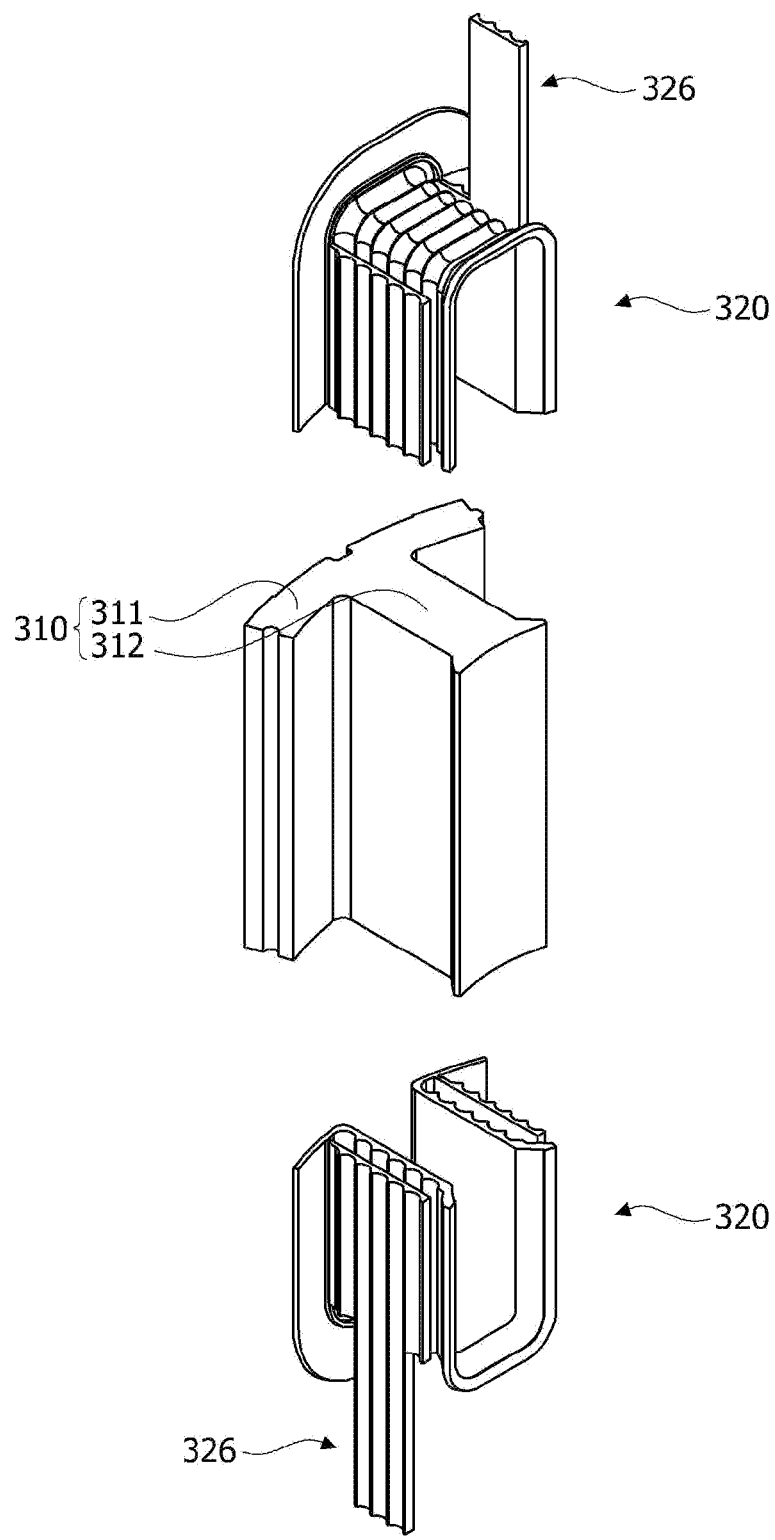

[FIG. 4]
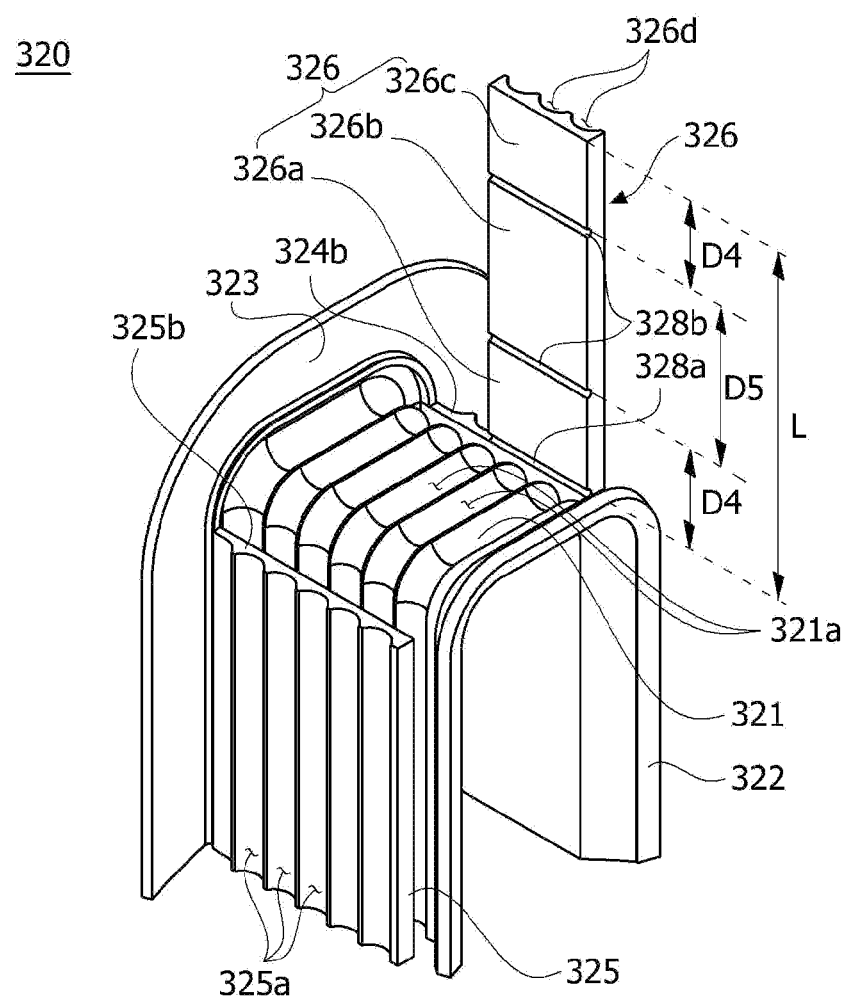

[FIG. 5]
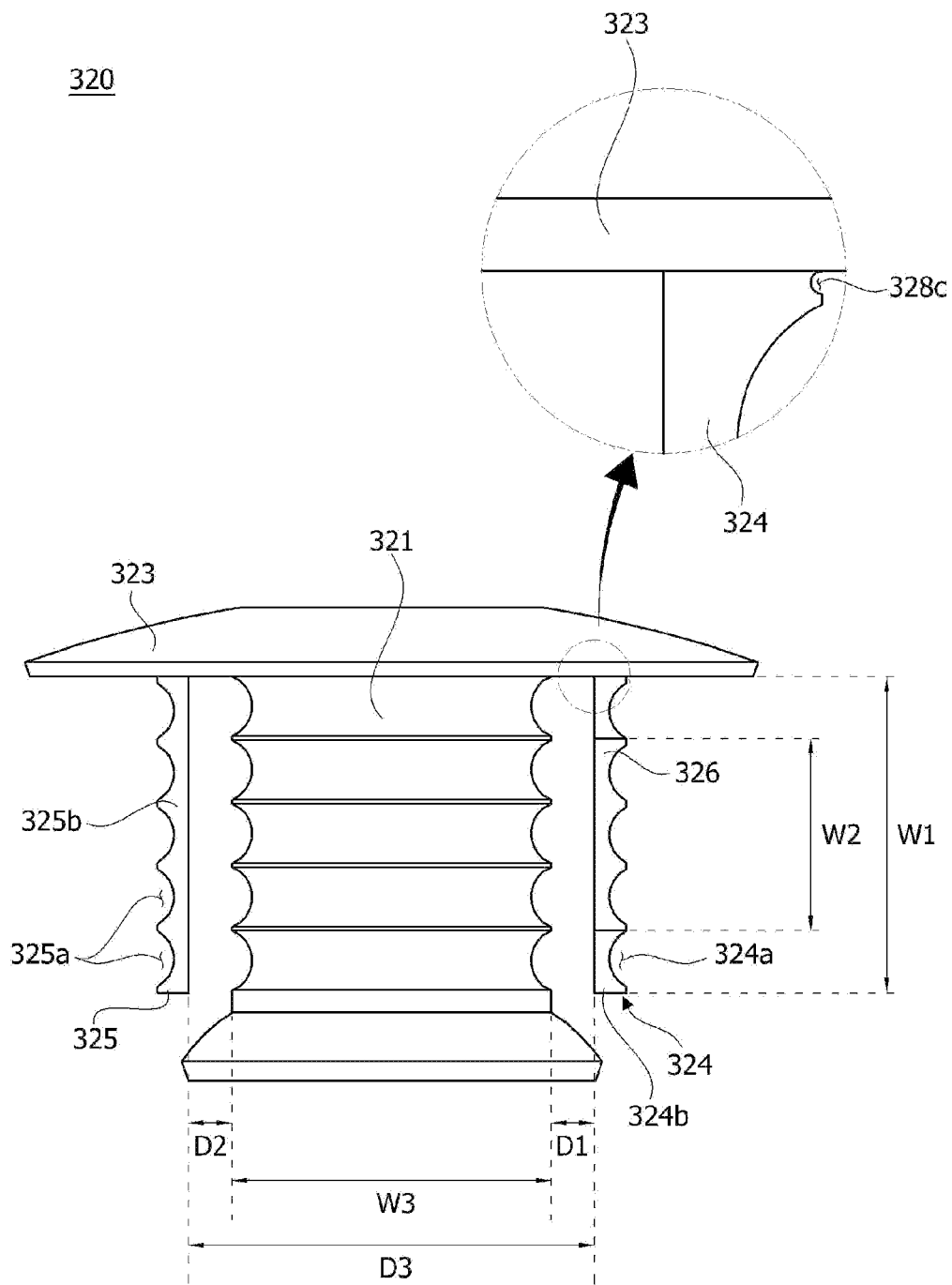

[FIG. 6A]
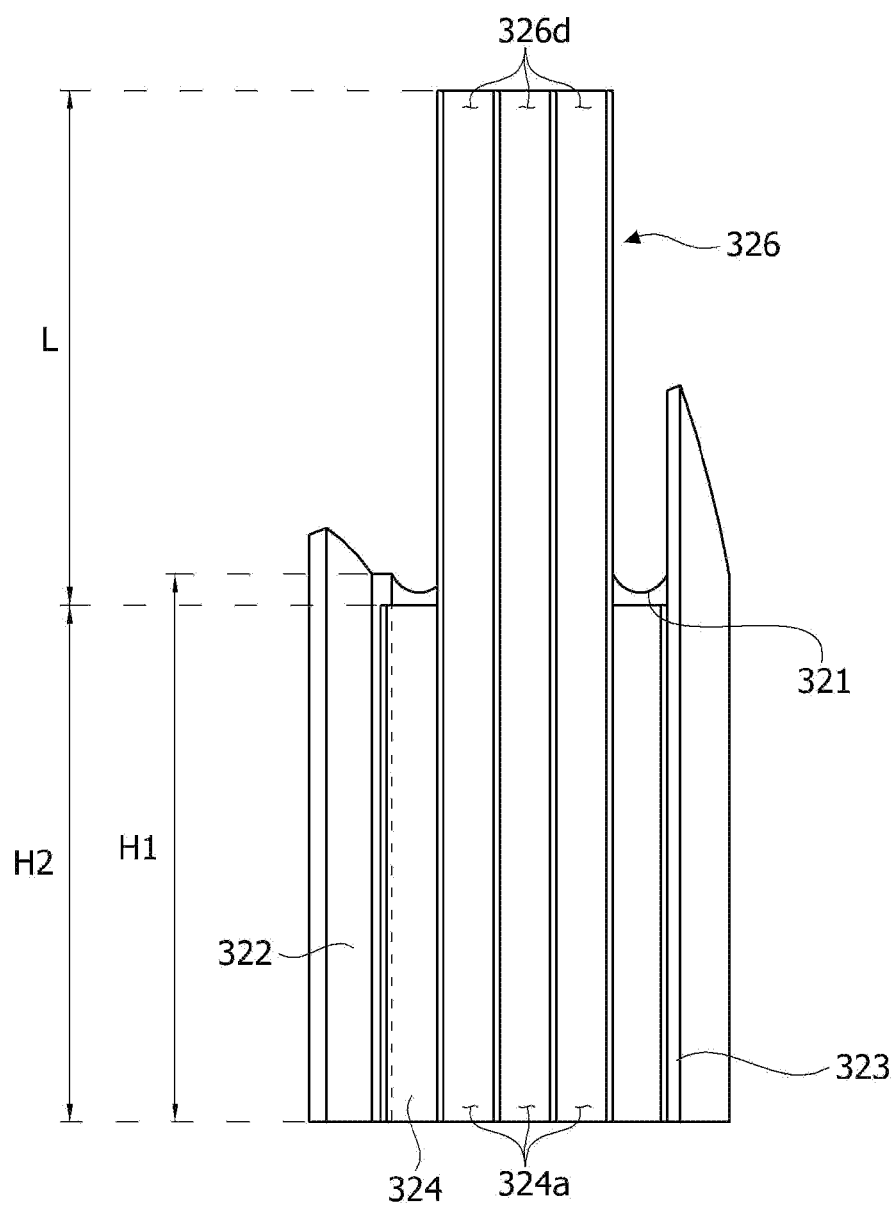

[FIG. 6B]
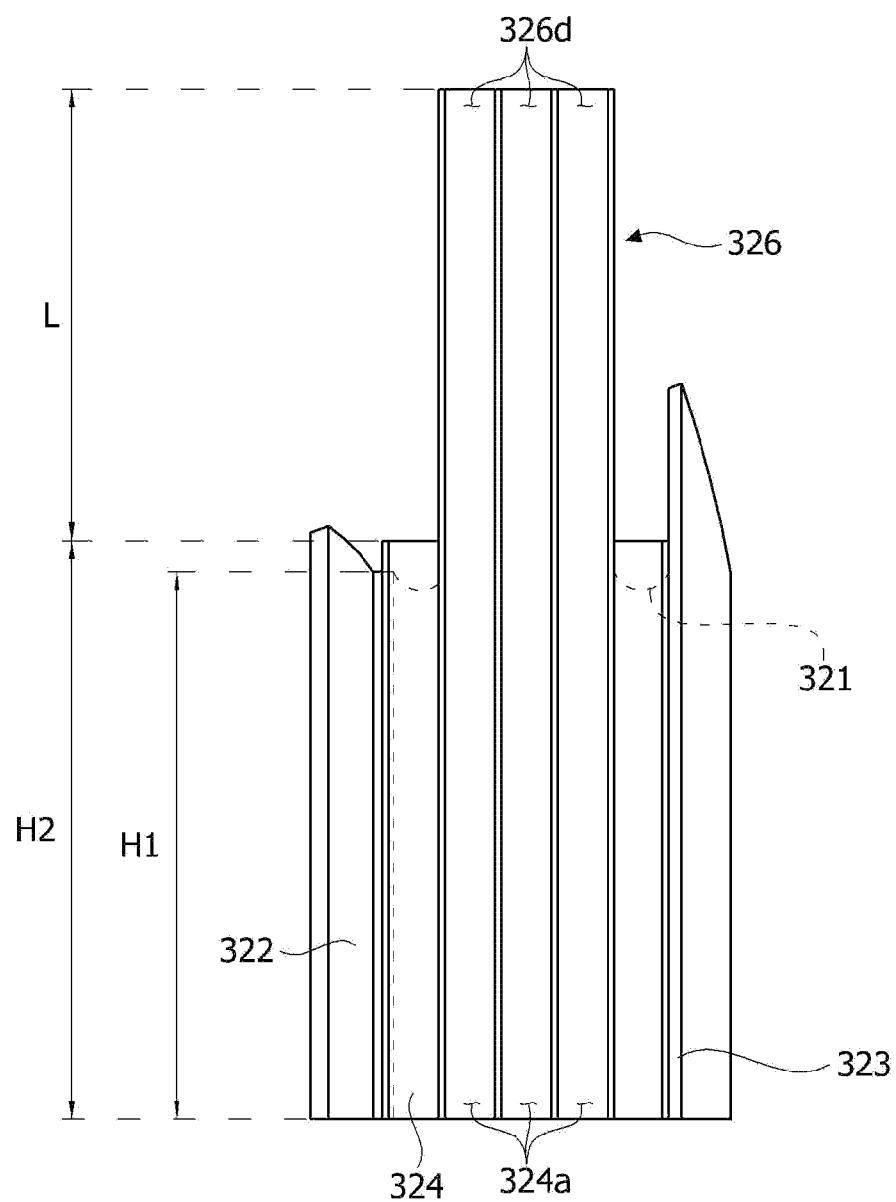

[FIG. 7]
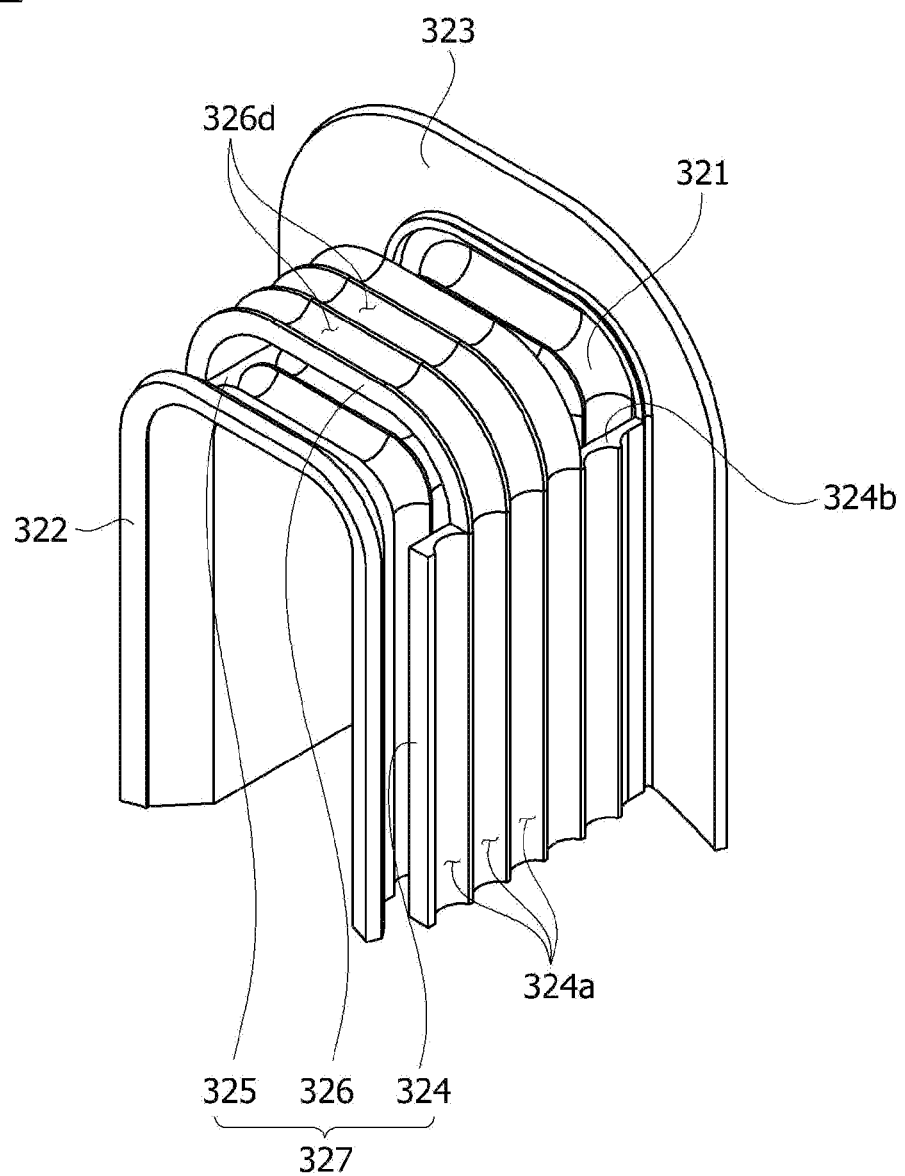

[FIG. 8]
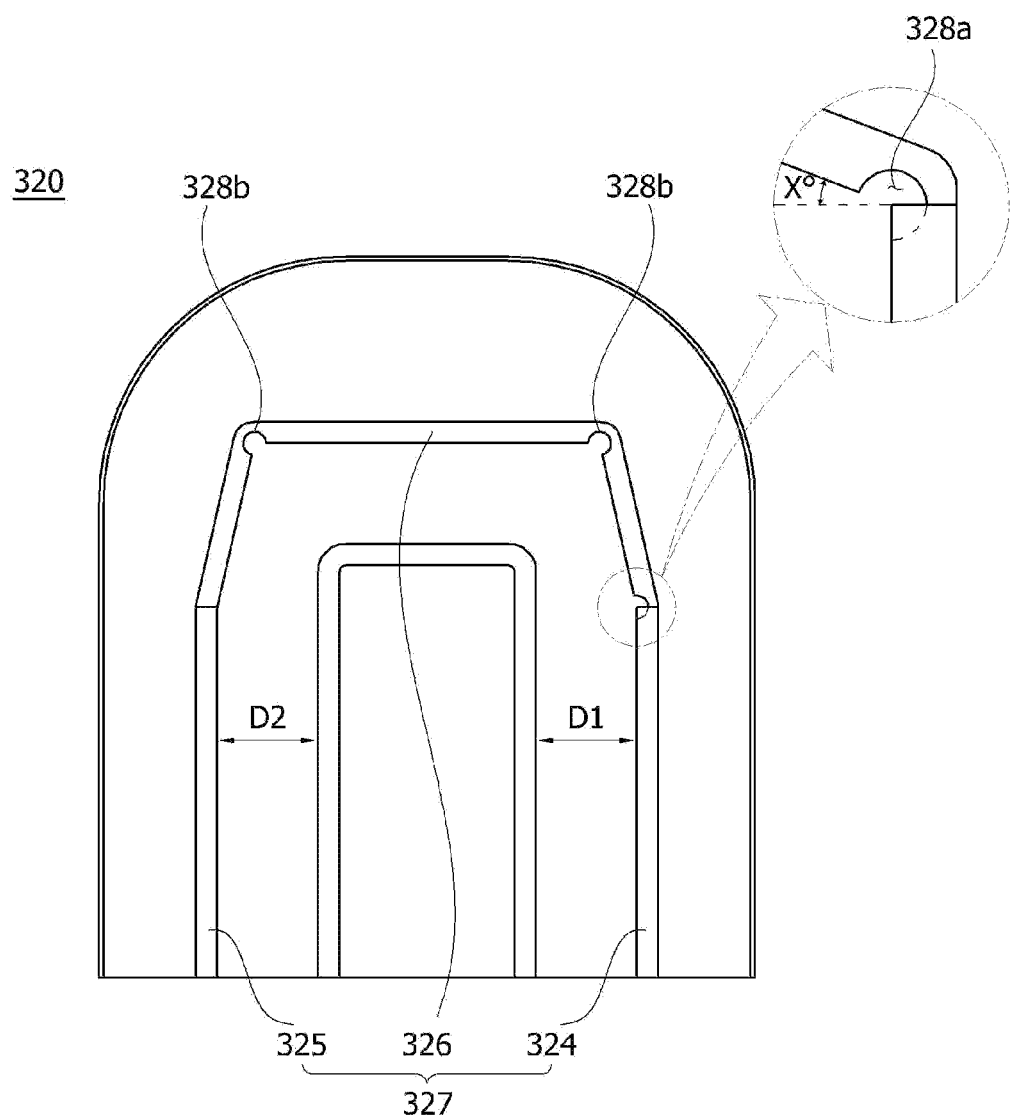

[FIG. 9]
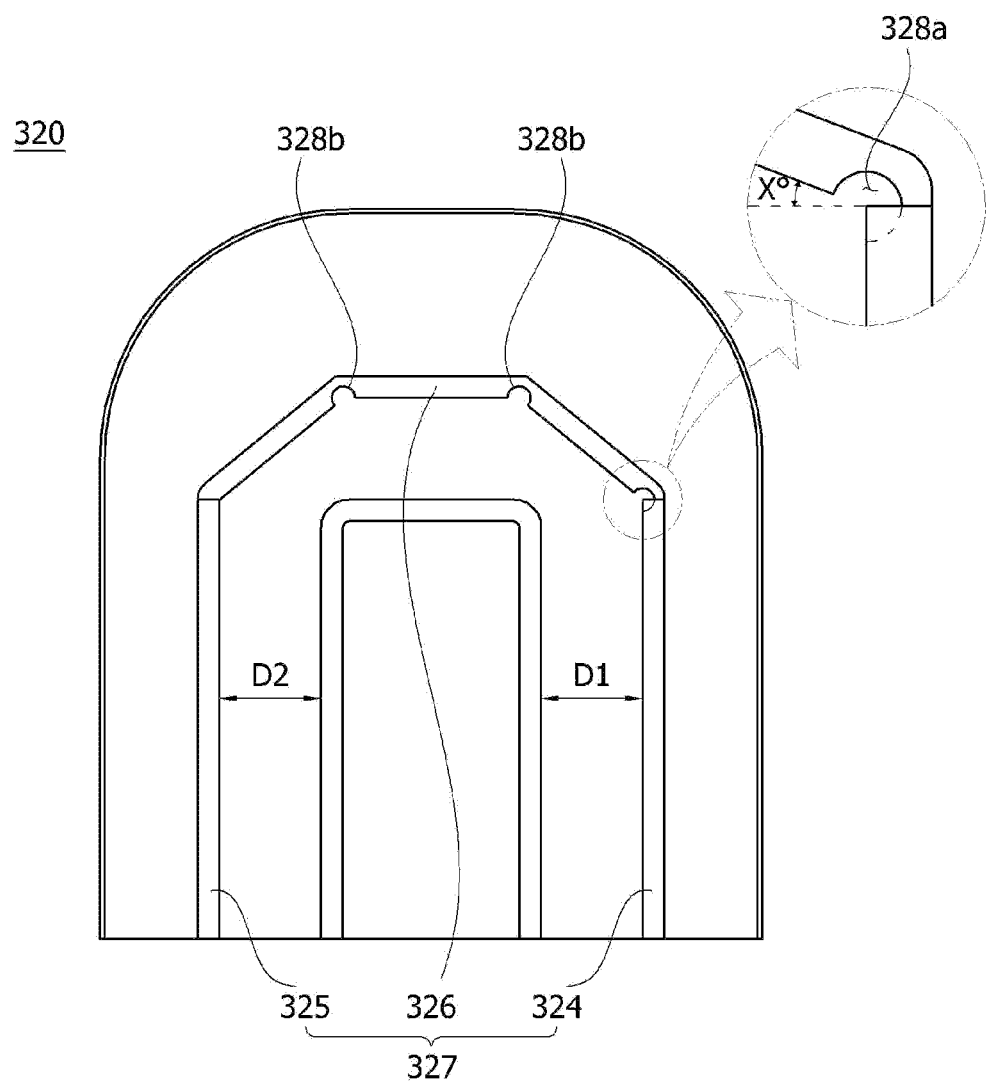

[FIG. 10]
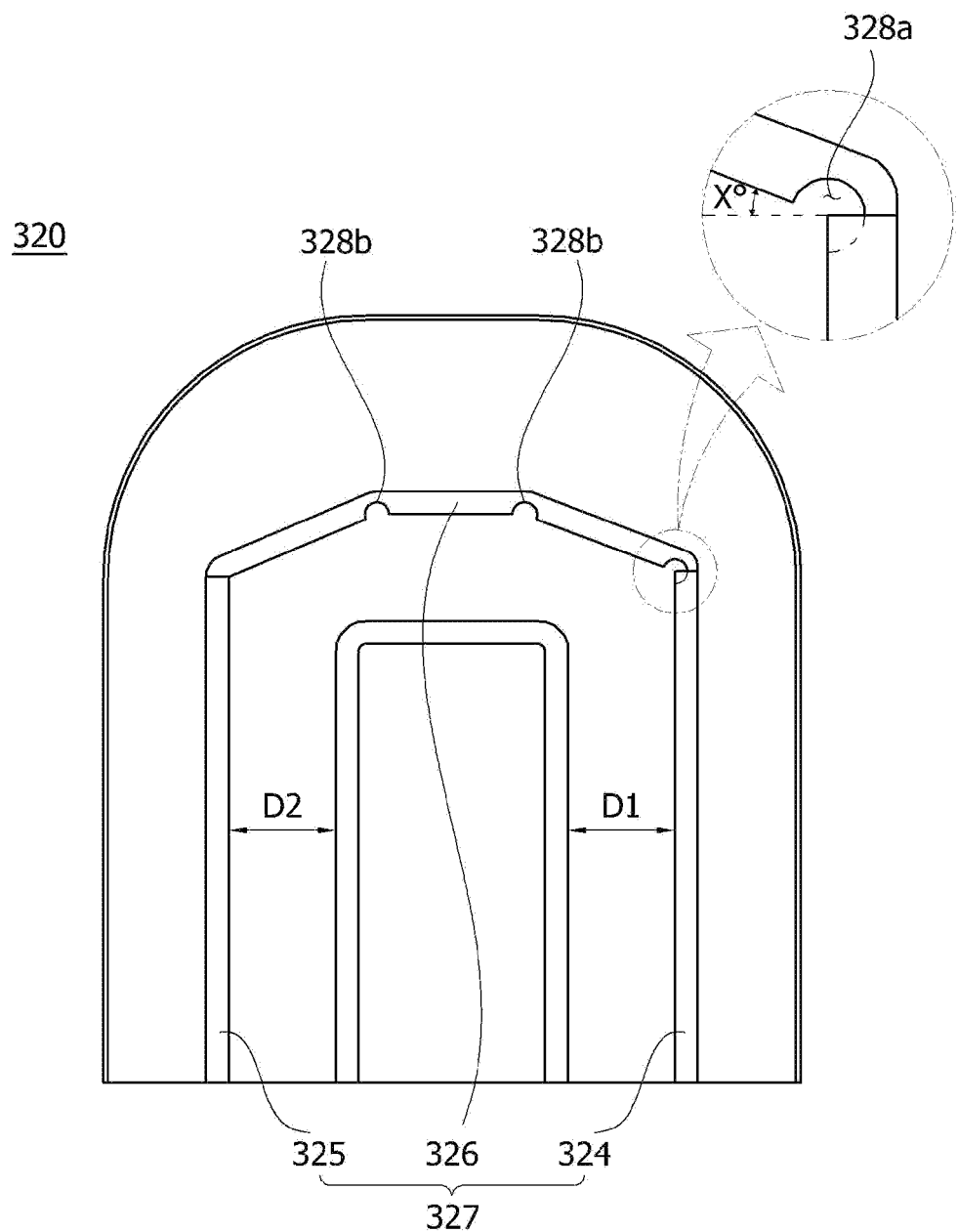

[FIG. 11]
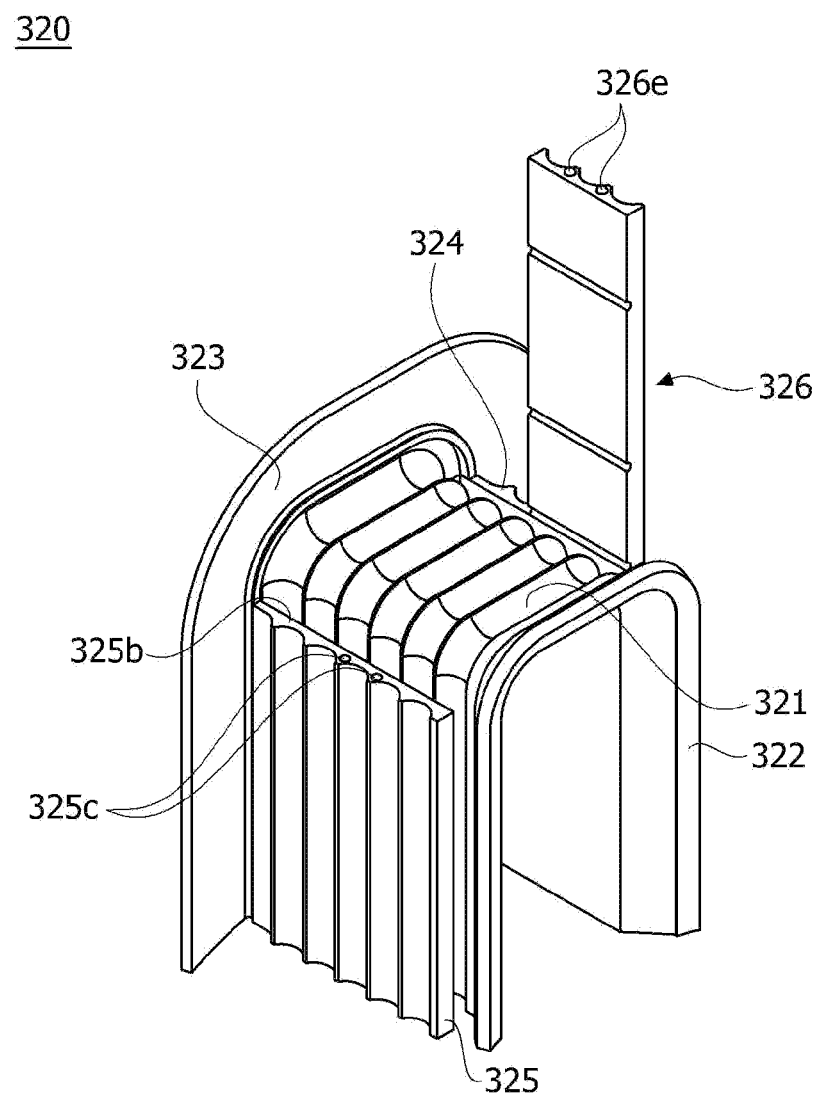

[FIG. 12]
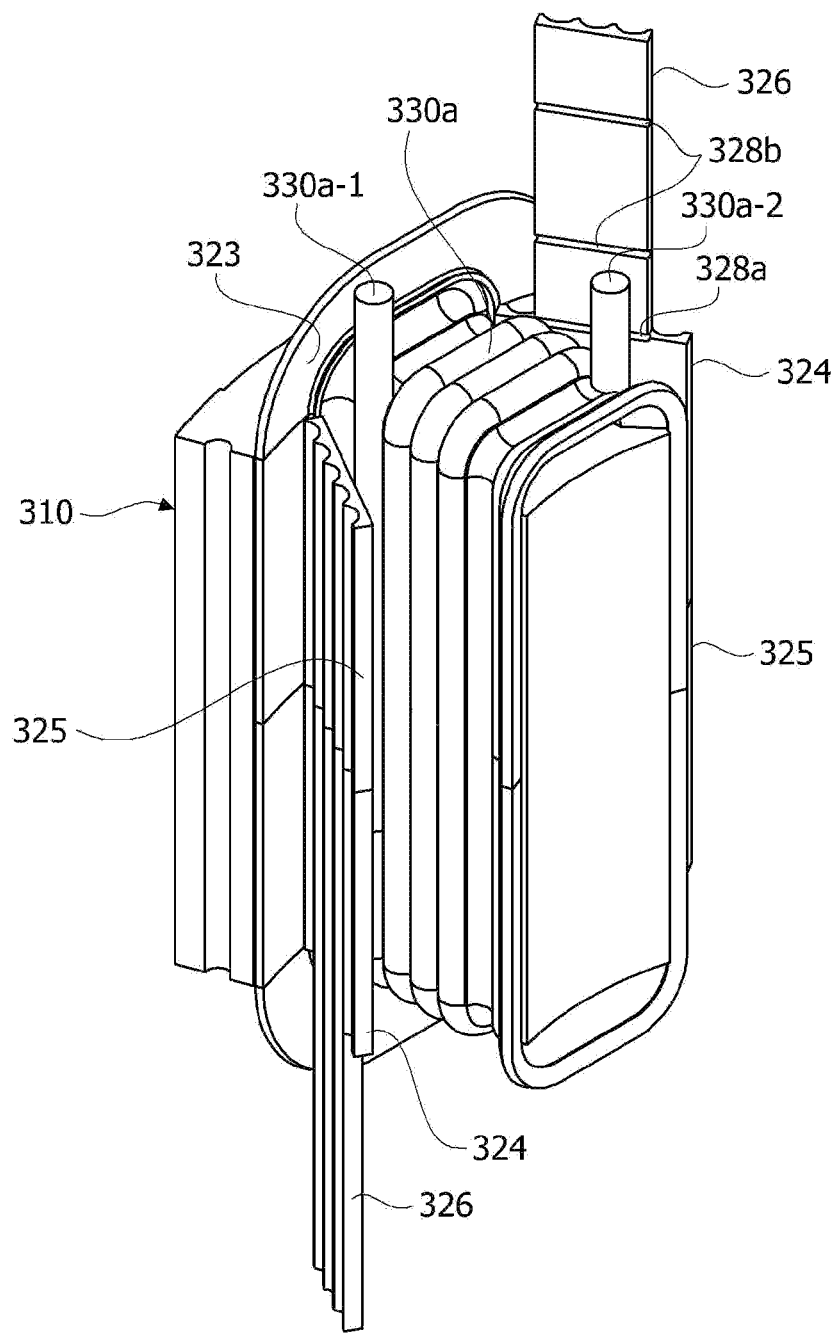

[FIG. 13]
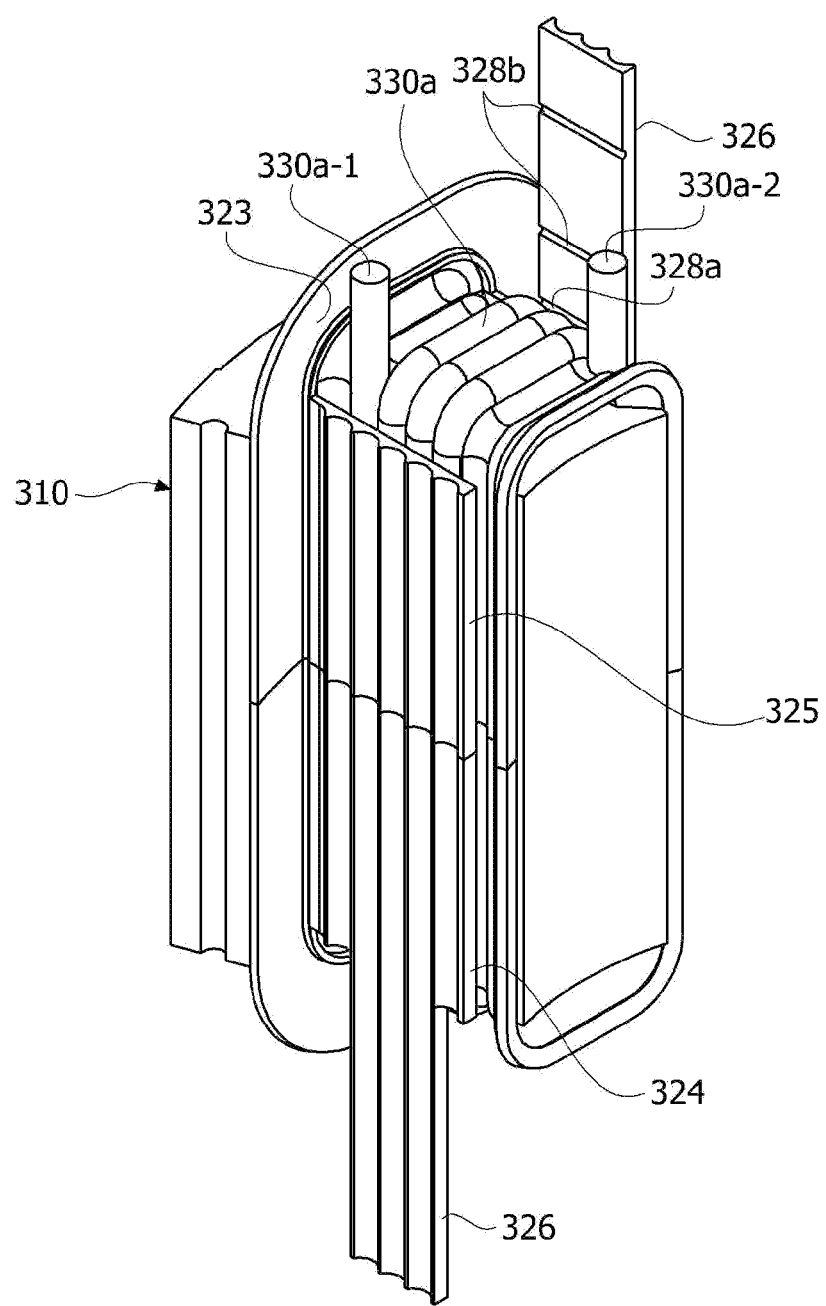

[FIG. 14]
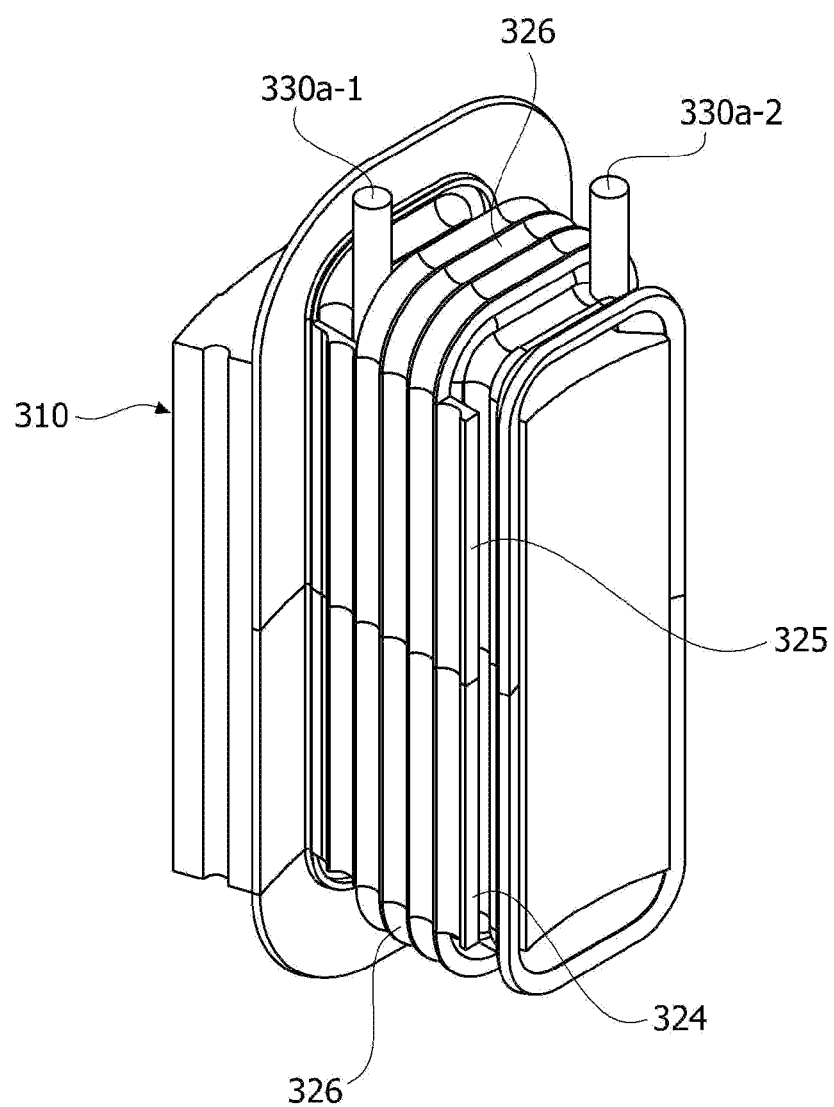

[FIG. 15]
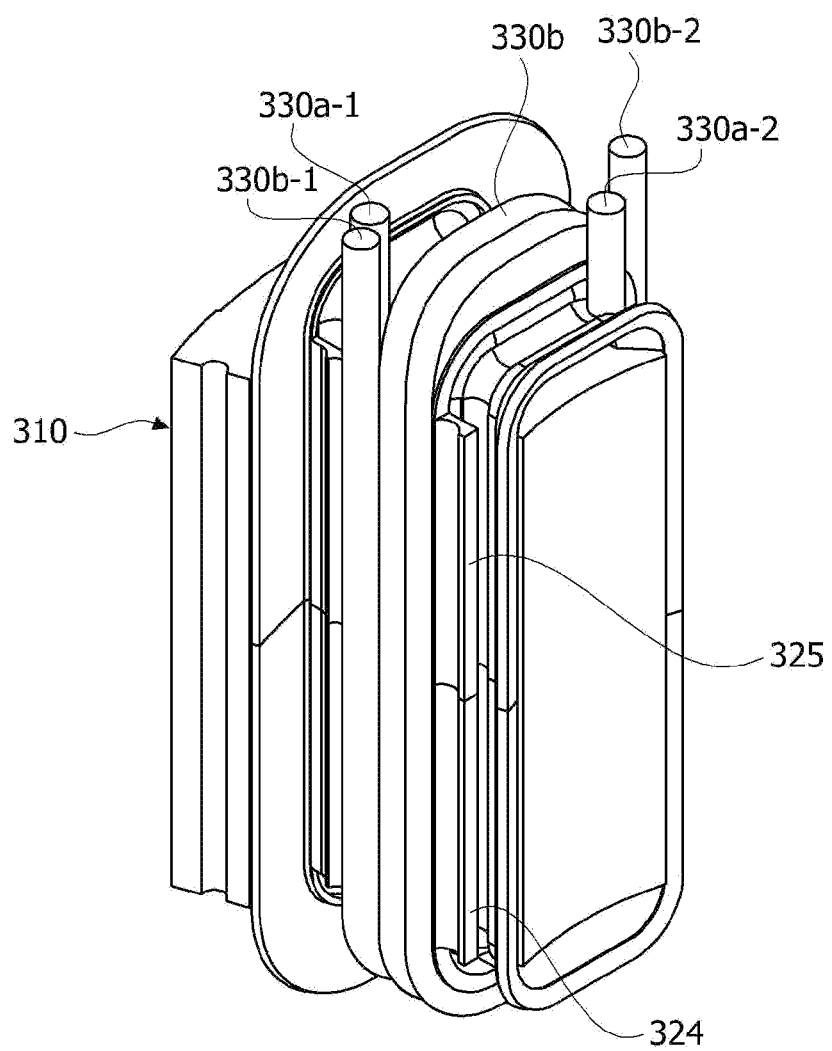

[FIG. 16]
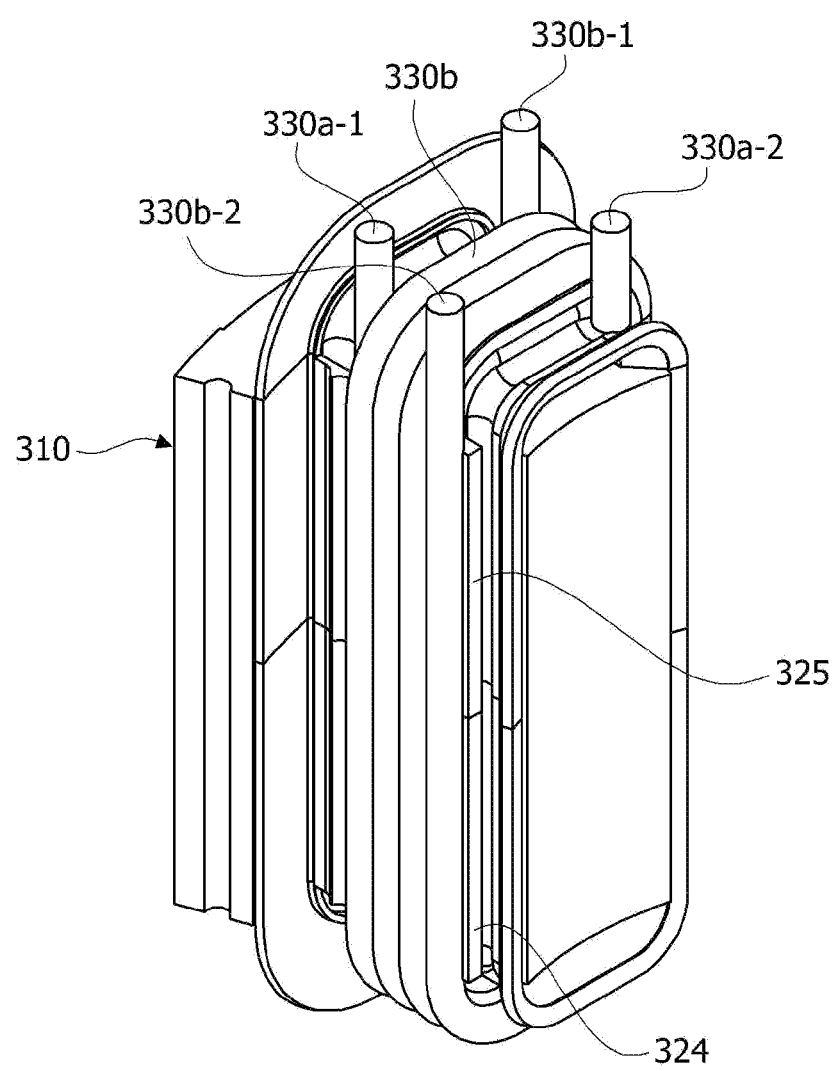

INSULATOR AND MOTOR COMPRISING SAME

CROSS-REFERENCE TO RELATED PATENT APPLICATIONS

This application is a U.S. National Stage Application under 35 U.S.C. § 371 of PCT Application No. PCT/KR2019/009513, filed Jul. 31, 2019, which claims priority to Korean Patent Application No. 10-2018-0093499, filed Aug. 10, 2018, whose entire disclosures are hereby incorporated by reference.

TECHNICAL FIELD

The present invention relates to an insulator and a motor including the same.

BACKGROUND ART

Motors are apparatuses which convert electrical energy into mechanical energy to obtain rotational force and are widely used in vehicles, home electronics, and industrial equipment.

The motor may include a housing, a shaft, a stator disposed in the housing, a rotor disposed on an outer circumferential surface of the shaft, and the like. In this case, the stator electrically interacts with the rotor to induce rotation of the rotor. In addition, the shaft also rotates according to the rotation of the rotor.

Meanwhile, the motors may be used in systems for securing steering stability of vehicles. For example, the motors may be used as vehicle motors for electronic power steering (EPS) systems and the like.

In order to implement two individual phases (among a U-phase, a V-phase, and a W-phase) in the motor, a dual winding process of individually winding two coils may be performed.

In this case, in the dual winding process, a first coil is wound by performing a first winding process, and a second coil is wound by performing a second winding process.

However, since the second coil is wound in a state in which the first coil is wound, there is a problem in that a short circuit occurs due to the first coil and the second coil being in contact with each other.

That is, an insulation problem may occur between the primarily wound first coil and the secondarily wound second coil.

Technical Problem

The present invention is directed to providing an insulator allowing an insulation problem between a first coil and a second coil to be solved when dual winding is implemented and a motor.

Objectives to be solved through the present invention are not limited to the above-described objective, and other objectives which are not mentioned above will be clearly understood by those skilled in the art through the following specification.

Technical Solution

One aspect of the present invention provides a motor including a housing, a stator disposed in the housing, a rotor disposed in the stator, and a shaft coupled to the rotor, wherein the stator includes a stator core, an insulator disposed on the stator core, and a coil wound around the insulator, the insulator includes a body portion, a guide portion coupled to the body portion, and a blade portion coupled to the guide portion, and the coil includes a first coil disposed between the body portion and the blade portion and a second coil disposed on the blade portion.

Another aspect of the present invention provides a motor including a housing, a stator disposed in the housing, a rotor disposed in the stator, and a shaft coupled to the rotor, wherein the stator includes a stator core, an insulator disposed on the stator core, and a coil wound around the insulator, the insulator includes a body portion, a guide portion coupled to the body portion, and a blade portion coupled to the guide portion, the blade portion includes a first blade portion and a second blade portion of which one or more portions are spaced apart from the body portion and a protruding portion extending from the first blade portion, and a width of the protruding portion is less than a width of the first blade portion.

The coil may include a first coil disposed between the body portion and the blade portion, and a second coil disposed on the first blade portion, the second blade portion, and the protruding portion.

The blade portion may include a plurality of first grooves in which the second coil is disposed.

The number of turns of the first coil wound around the body portion may be the same as the number of turns of the second coil wound around the blade portion.

The protruding portion may include a plurality of second grooves formed in a direction perpendicular to the first grooves of the blade portion.

The number of the second grooves formed in the protruding portion of the blade portion may be less than the number of the first grooves formed in the first blade portion.

The protruding portion may include a first region closest to the first blade portion, a third region closest to the second blade portion, and a second region disposed between the first region and the third region, which are divided by the plurality of second grooves, and a length of the second region in a circumferential direction may be less than a length of the body portion in the circumferential direction.

Each of the first coil and the second coil may include a start line from which winding is started and an end line at which the winding is ended, and the start line and the end line of the first coil may be disposed close to the first region and the third region to be spaced apart from each other in a radial direction.

The start line of the first coil disposed between the body portion and the second blade portion may be disposed at an outer side in the radial direction, and the end line of the second coil disposed on the second blade portion may be disposed at an inner side in the radial direction.

The first blade portion and the second blade portion may be disposed opposite to each other, and the body portion may be disposed between the first blade portion and the second blade portion which are disposed to be spaced apart from each other.

A height of the first blade portion and a height of the second blade portion may be greater than a height of the body portion. In this case, a length of the protruding portion may be greater than a distance between the first blade portion and the second blade portion.

The body portion, the guide portion, and the blade portion may be integrally formed. In addition, the guide portion may include an outer guide extending from an outer side of the body portion in a vertical direction, and the blade portion may extend from an inner surface of the outer guide in a direction perpendicular to the outer guide.

The first coil may not be physically connected to the second coil.

Still another aspect of the present invention provides a motor including a housing, a stator disposed in the housing, a rotor disposed in the stator, and a shaft coupled to the rotor, wherein the stator includes a stator core, an insulator disposed on the stator core, and a coil wound around the insulator, and the insulator includes a first body, an inner guide protruding from an inner side of the first body, an outer guide protruding from an outer side of the first body, a first blade portion disposed to be spaced apart from one side of the first body and protruding from the outer guide in a radial direction, a second blade portion disposed to be spaced apart from the other side of the first body portion and protruding from the outer guide in the radial direction, and a protruding portion extending from one side of the first blade portion in a shaft direction.

When the protruding portion is coupled to one side of the second blade portion in the shaft direction, the first blade portion, the second blade portion, and the protruding portion form a second body, the coil includes a first coil and a second coil, the first coil is wound around the first body, and the second coil is wound around the second body.

A width of the protruding portion may be less than a width of the first blade portion in the radial direction.

The protruding portion may be disposed at a central portion of the first blade portion.

The first coil may include a start line and an end line, and one of the start line and the end line may be disposed between the protruding portion and the outer guide.

A first groove may be formed in a region in which the first blade portion meets the protruding portion in the radial direction.

The protruding portion may further include a second groove formed in the radial direction, and the second groove may be disposed to be spaced apart from the first groove.

A separation distance (D4) between the first groove and the second groove may be greater than a separation distance (D1) between the first body and the first blade portion.

The protruding portion may include two second grooves disposed to be spaced apart from each other in a longitudinal direction of the protruding portion, the protruding portion may include a first region, a second region, and a third region, which are defined by the two second grooves, and the second region may be disposed to overlap the first body in the shaft direction.

A height of the first blade portion may be greater than a height of the first body in the shaft direction.

A length of the protruding portion may be greater than a distance between the first blade portion and the second blade portion.

A third groove may be formed at a corner at which the first blade portion meets the outer guide in the shaft direction.

The second coil may be disposed to overlap the first coil in the shaft direction.

The second coil may be disposed between the start line and the end line of the first coil in the radial direction.

The first coil may be wound around the first body in a state in which the first blade portion and the second blade portion are tilted in directions opposite to directions toward the first body.

Yet another aspect of the present invention provides an insulator including a first body, an inner guide protruding from an inner side of the first body, an outer guide protruding from an outer side of the first body, a first blade portion disposed to be spaced apart from one side of the first body and protruding from the outer guide in a radial direction, a second blade portion disposed to be spaced apart from the other side of the first body and protruding from the outer guide in the radial direction, and a protruding portion extending from one side of the first blade portion in a shaft direction.

A width of the protruding portion may be less than a width of the first body in the radial direction, and the protruding portion may be disposed in a central portion of the first blade portion.

A second-1 groove may be formed in a region in which the first blade portion meets the protruding portion in the radial direction.

The protruding portion may further include a second-2 groove formed in the radial direction, the second-2 groove may be disposed to be spaced apart from the second-1 groove, and a separation distance (D4) between the second-1 groove and the second-2 groove may be greater than a separation distance (D1) between the first body portion and the first blade portion.

A height of the first blade portion may be greater than a height of the first body portion in the shaft direction.

A third groove may be formed at a corner at which the first blade portion meets the outer guide in the shaft direction.

Advantageous Effects

In a motor according to embodiments, a problem in that a short circuit occurs between a first coil and a second coil can be prevented using an insulator when dual winding is implemented.

When the first coil is wound, since a first blade portion and a second blade portion of the insulator are tilted in opposite directions, the first coil can be easily wound.

Various useful advantages and effects of the present invention are not limited to the above-described contents and will be more easily understood in the description of specific embodiments of the present invention.

DESCRIPTION OF DRAWINGS

FIG. 1 is a view illustrating a motor according to an embodiment.

FIG. 2 is a view illustrating a stator of the motor according to the embodiment.

FIG. 3 is an exploded perspective view illustrating a stator core and an insulator of the stator disposed in the motor according to the embodiment.

FIG. 4 is a perspective view illustrating the insulator of the motor according to the embodiment.

FIG. 5 is a plan view illustrating the insulator of the motor according to the embodiment.

FIG. 6A is a side view illustrating an example of the insulator disposed in the motor according to the embodiment.

FIG. 6B is a side view illustrating another example of the insulator disposed in the motor according to the embodiment.

FIG. 7 is a view illustrating a state in which a protruding portion of the insulator is coupled to a second blade portion in the motor according to the embodiment.

FIG. 8 is a front view illustrating an example of a state in which the protruding portion of the insulator is coupled to the second blade portion in the motor according to the embodiment.

FIG. 9 is a front view illustrating another example of a state in which the protruding portion of the insulator is coupled to the second blade portion in the motor according to the embodiment.

FIG. 10 is a front view illustrating still another example of a state in which the protruding portion of the insulator is coupled to the second blade portion in the motor according to the embodiment.

FIG. 11 is a view illustrating a protrusion formed on the protruding portion of the insulator and a groove formed in the second blade portion in the motor according to the embodiment.

FIGS. 12 to 15 are views illustrating a process of winding coils around the insulator of the motor according to the embodiment.

FIG. 16 is a view illustrating a case in which a winding direction of a first coil and a winding direction of a second coil are different in the motor according to the embodiment.

MODES OF THE INVENTION

Hereinafter, exemplary embodiments of the present invention will be described in detail with reference to the accompanying drawings.

However, the technical spirit of the present invention is not limited to some embodiments which will be described and may be realized using various other embodiments, and at least one component of the embodiments may be selectively coupled, substituted, and used to realize the technical spirit within the range of the technical spirit.

In addition, unless clearly and specifically defined otherwise by context, all terms (including technical and scientific terms) used herein can be interpreted in a sense generally understandable to those skilled in the art, and meanings of generally used terms, such as those defined in commonly used dictionaries, will be interpreted in consideration of contextual meanings of the related technology.

In addition, the terms used in the embodiments of the present invention are considered in a descriptive sense and not to limit the present invention.

In the present specification, unless clearly indicated otherwise by the context, singular forms include the plural forms thereof, and in a case in which "at least one (or one or more) among A, B, and C" is described, this may include at least one combination among all combinations using A, B, and C.

In descriptions of components of the present invention, terms such as "first," "second," "A," "B," "(a)," and "(b)" can be used.

The terms are only to distinguish one element from another element, and an essence, order, and the like of the element are not limited by the terms.

In addition, it should be understood that, when an element is referred to as being "connected or coupled" to another element, such a description may include both a case in which the element is directly connected or coupled to another element, and a case in which the element is connected or coupled to another element with still another element disposed therebetween.

In addition, in a case in which any one element is described as being formed or disposed "on or under" another element, such a description includes both a case in which the two elements are formed or disposed to be in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, embodiments will be described in detail with reference to the accompanying drawings, and components that are the same or correspond to each other are denoted by the same reference numeral regardless of the figure number, and redundant description thereof will be omitted.

FIG. 1 is a view illustrating a motor according to an embodiment. An x-direction of FIG. 1 may denote a shaft direction, and a y-direction may denote a radial direction. In this case, the shaft direction may be perpendicular to the radial direction. Here, the shaft direction may be a longitudinal direction of a shaft 500.

Referring to FIG. 1, the motor 1 according to the embodiment may include a housing 100 in which an opening is formed at one side thereof, a cover 200 disposed on the housing 100, a stator 300 disposed in the housing 100, a rotor 400 disposed inside the stator 300, a shaft 500 configured to rotate with the rotor 400, a bus bar 600 disposed on the stator 300, and a sensor portion 700 configured to detect rotation of the shaft 500. Here, the term "inside" denotes a direction toward a center C in the radial direction, and the term "outside" denotes a direction opposite to "inside."

The motor 1 may be a motor used in an electronic power steering (EPS) system. The EPS system may denote a system configured to assist a steering force using a driving force of the motor to secure turning stability and quickly provide a restoring force so that a driver may safely drive a vehicle.

The housing 100 and the cover 200 may form an exterior of the motor 1. In addition, an accommodation space may be formed by coupling the housing 100 and the cover 200. Accordingly, as illustrated in FIG. 1, the stator 300, the rotor 400, the shaft 500, the bus bar 600, the sensor portion 700, and the like may be disposed in the accommodation space. In this case, the shaft 500 may be rotatably disposed in the accommodation space. Accordingly, the motor 1 may further include bearings 10 disposed on upper and lower portions of the shaft 500.

The housing 100 may be formed in a cylindrical shape. In addition, the housing 100 may accommodate the stator 300, the rotor 400, and the like therein. In this case, a shape or material of the housing 100 may be variously changed. For example, the housing 100 may be formed of a metal material which withstands even high temperatures well.

The cover 200 may be disposed on an open surface of the housing 100, that is, an upper portion of the housing 100, to cover the opening of the housing 100.

The stator 300 may be accommodated in the housing 100. In addition, the stator 300 electrically interacts with the rotor 400. In this case, the stator 300 may be disposed outside the rotor 400 in the radial direction.

Referring to FIG. 1, the stator 300 may include stator cores 310, insulators 320 disposed on the stator cores 310, and coils 330 wound around the insulators 320. In addition, the coils 330 may include a first coil 330*a* and a second coil 330*b*.

In this case, the first coil 330*a* may be wound around a body portion of the insulator 320. However, the body portion, around which the first coil 330*a* is wound, of the insulator 320 may be referred to as a first body portion 321 in order to distinguish the body portion from a second body portion 327 formed for winding the second coil 330*b*. Accordingly, the first coil 330*a* may be wound around the first body portion 321 of the insulator 320, and the second coil 330*b* may be wound around the second body portion 327. In this case, a blade portion of the insulator 320 may be used as a meaning including a first blade portion 324 and a second blade portion 325 disposed to be spaced apart from each other in a circumferential direction. In addition, first grooves which guide an arrangement of the second coil 330b may be formed in the blade portion. Accordingly, the first grooves may be formed in each of the first blade portion 324 and the second blade portion 325.

Accordingly, among the coils 330, the first coil 330a may be disposed between the first body portion 321 and the blade portion, and the second coil 330b may be disposed on the blade portion. Specifically, among the coils 330, the first coil 330a may be disposed between the first body portion 321 and the blade portion, and the second coil 330b may be disposed on the first blade portion 324, the second blade portion 325, and a protruding portion 326.

As illustrated in FIG. 1, the first coil 330a and the second coil 330b are disposed to be spaced apart from each other in the shaft direction, and the second body portion 327 is disposed between the first coil 330a and the second coil 330b so that an insulation problem which may occur between the first coil 330a and the second coil 330b may be solved.

FIG. 2 is a view illustrating the stator of the motor according to the embodiment, and FIG. 3 is an exploded perspective view illustrating the stator core and the insulator of the stator disposed in the motor according to the embodiment.

The stator 300 may be formed of a plurality of stator units.

In this case, the plurality of stator units illustrated in FIG. 2 are disposed in the circumferential direction so that the stator 300 of the motor 1 may be implemented.

Referring to FIGS. 2 to 3, the stator unit may include the stator core 310, the insulators 320 disposed on the stator core 310, and the coils 330 wound around the insulators 320.

A plurality of thin steel plates may be stacked to form the stator core 310, but the stator core 310 is not necessarily limited thereto. For example, the stator core 310 may be formed as one single product.

The stator core 310 may include an arc-shaped yoke 311 and a tooth 312. In addition, the tooth 312 may be formed to protrude from an inner circumferential surface of the yoke 311 in the radial direction for winding the coil 330. In this case, an example in which the yoke 311 and the tooth 312 are integrally formed is illustrated, but the yoke 311 and the tooth 312 are not necessarily limited thereto.

The tooth 312 may be disposed to face a magnet of the rotor 400.

The insulators 320 are disposed on the stator core 310. As illustrated in FIG. 3, the insulators 320 may be coupled to an upper side and a lower side of the tooth 312 of the stator core 310. In addition, the insulators 320 may insulate the stator core 310 from the coils 330. In this case, the insulator 320 may be formed of a synthetic resin material.

FIG. 4 is a perspective view illustrating the insulator of the motor according to the embodiment, FIG. 5 is a plan view illustrating the insulator of the motor according to the embodiment, FIGS. 6A and 6B are side views illustrating the insulator of the motor according to the embodiment, and FIG. 7 is a view illustrating a state in which the protruding portion of the insulator is coupled to the second blade portion in the motor according to the embodiment.

Referring to FIGS. 4 to 7, the insulator 320 may include the first body portion 321, an inner guide 322 protruding from an inner side of the first body portion 321, an outer guide 323 protruding from an outer side of the first body portion 321, the first blade portion 324 disposed to be spaced apart from one side of the first body portion 321 and protruding from the outer guide 323 in the radial direction, the second blade portion 325 disposed to be spaced apart from the other side of the first body portion 321 and protruding from the outer guide 323 in the radial direction, and the protruding portion 326 extending from one side of the first blade portion 324 in the shaft direction. In this case, the insulator 320 may include guide portions, and the guide portions may be used as a meaning including the inner guide 322 and the outer guide 323.

As illustrated in FIG. 7, when the protruding portion 326 is coupled to or in contact with one side of the second blade portion 325 in the shaft direction, the first blade portion 324, the second blade portion 325, and the protruding portion 326 may form the second body portion 327. Accordingly, the second body portion 327 may be formed in a " ⊂ " or "U" shape or the like. In this case, the first body portion 321, the inner guide 322, the outer guide 323, the first blade portion 324, the second blade portion 325, and the protruding portion 326 may be integrally formed.

In addition, the insulator 320 may further include second grooves in consideration of bending of the protruding portion 326 and a third groove 328c in consideration of opening of the first blade portion 324. In this case, the second grooves may be used as a meaning including a second-1 groove 328a and a second-2 groove 328b.

The coil 330 may be wound around the first body portion 321. For example, the first coil 330a may be wound around the first body portion 321 disposed between the first blade portion 324 and the second blade portion 325.

The first body portion 321 may be disposed on the stator core 310 to insulate the stator core 310 from the coil 330.

The first body portion 321 may be formed in a " ⊂ " or "U" shape or the like, and grooves 321a may be formed in the first body portion 321. In this case, the grooves 321a may be formed in a concave shape and referred to as fourth grooves. In addition, when the first coil 330a is wound, the grooves 321a may guide an arrangement of the first coil 330a.

The inner guide 322 may support the coils 330 wound around the first body portions 321 and the second body portions 327 to prevent the coils 330 from being separated inward. Specifically, the inner guide 322 supports the first coil 330a wound around the first body portion 321 to prevent the first coil 330a from being separated inward.

The inner guide 322 may be disposed inside the first body portion 321. In addition, the inner guide 322 may be formed to protrude from the inner side of the first body portion 321 in the shaft direction and in the circumferential direction.

The outer guide 323 may support the coils 330 wound around the first body portion 321 and the second body portion 327 to prevent the coils 330 from being separated outward.

The outer guide 323 may be disposed outside the first body portion 321. In addition, the outer guide 323 may be formed to protrude from the outer side of the first body portion 321 in the shaft direction. Alternatively, the outer guide 323 may extend from the outer side of the first body portion 321 in a direction perpendicular to the first body portion 321.

In this case, the outer guide 323 may be disposed on an upper surface or lower surface of the yoke 311. Accordingly, the outer guide 323 may be disposed to overlap the yoke 311 in the shaft direction.

The first blade portion 324 may be disposed between the first coil 330a and the second coil 330b to insulate the first coil 330a from the second coil 330b. In this case, the first blade portion 324 may be disposed opposite to the second blade portion 325 in the circumferential direction.

As illustrated in FIG. 5, the first blade portion 324 may be formed to protrude from the outer guide 323 in the radial direction. Alternatively, the first blade portion 324 may extend from the outer guide 323 in a direction perpendicular to the outer guide 323. In this case, the first blade portion 324 may be formed in a plate shape.

As illustrated in FIG. 5, the first blade portion 324 may be disposed to be spaced apart from one side of the first body portion 321 by a predetermined first separation distance D1 in consideration of winding of the first coil 330a. In this case, the first separation distance D1 may be 1.5 times an outer diameter of the coil 330.

In addition, first grooves 324a may be formed in the first blade portion 324 in the shaft direction. In this case, the first groove 324a may be formed in a concave shape. In addition, when the second coil 330b is wound, the first grooves 324a may guide the arrangement of the second coil 330b.

In FIGS. 6A and 6B, FIG. 6A is a side view illustrating an example of the insulator disposed in the motor according to the embodiment, and FIG. 6B is a side view illustrating another example of the insulator disposed in the motor according to the embodiment.

Referring to FIG. 6A, a height H2 of the first blade portion 324 may be less than a height H1 of the first body portion 321 in the shaft direction. In this case, the height H2 of the first blade portion 324 may be the same as a height of the second blade portion 325. Accordingly, the first blade portion 324 and the second blade portion 325 may be tilted or not be tilted easily in order to wind the first coil 330a.

Referring to FIG. 6B, a height H2 of the first blade portion 324 may be greater than a height H1 of the first body portion 321 in the shaft direction. In this case, the height H2 of the first blade portion 324 may be the same as a height of the second blade portion 325. Accordingly, the height of the second blade portion 325 may be greater than the height H1 of the first body portion 321.

The height H2 of the first blade portion 324 may be greater than the height H1 of the first body portion 321 by 1.5 times the outer diameter of the coil 330. Accordingly, when the protruding portion 326 is bent after the first coil 330a is wound, the first blade portion 324 may minimize interference with the first coil 330a.

Referring to FIG. 5, the third groove 328c may be formed at a side of a corner at which the first blade portion 324 meets the outer guide 323 in the shaft direction. As illustrated in FIG. 5, the third groove 328c may be formed at one side of the first blade portion 324 in the shaft direction and disposed close to the outer guide 323. Accordingly, the third groove 328c may allow the first blade portion 324 to be tilted or not be tilted easily. In this case, when the first coil 330a is wound, the first blade portion 324 enters a tilted state, and when the second coil 330b is wound, the first blade portion 324 enters a state of not being tilted. In this case, the term "close to" may denote being in contact with or being spaced a predetermined distance from the corner at which the first blade portion 324 meets the outer guide 323.

The second blade portion 325 may be disposed between the first coil 330a and the second coil 330b to insulate the first coil 330a from the second coil 330b.

As illustrated in FIG. 5, the second blade portion 325 may be formed to protrude from the outer guide 323 in the radial direction. Alternatively, the second blade portion 325 may extend from the outer guide 323 in the direction perpendicular to the outer guide 323. In this case, the second blade portion 325 may be formed in a plate shape.

As illustrated in FIG. 5, the second blade portion 325 may be disposed to be spaced apart from the other side of the first body portion 321 by a predetermined second separation distance D2 in consideration of the winding of the first coil 330a. In this case, the second separation distance D2 may be 1.5 times the outer diameter of the coil 330. Accordingly, the first separation distance D1 may be the same as the second separation distance D2.

In addition, first grooves 325a may be formed in the second blade portion 325 in the shaft direction. In this case, the first groove 325a may be concavely formed in a groove shape. In addition, when the second coil 330b is wound, the first grooves 325a may guide the arrangement of the second coil 330b.

In addition, a third groove 328c may be formed at a side of a corner at which the second blade portion 325 meets the outer guide 323 in the shaft direction. Referring to FIG. 5, the third groove 328c is formed at one side of the first blade portion 324 in the shaft direction, and similarly, the third groove 328c may also be formed at the side of the corner at which the second blade portion 325 meets the outer guide 323.

Accordingly, the third groove 328c may allow the second blade portion 325 to be tilted or not be tilted easily. In this case, when the first coil 330a is wound, the second blade portion 325 enters a tilted state, and when the second coil 330b is wound, the second blade portion 325 enters a state of not being tilted. In this case, the term "close to" may denote being in contact with or being spaced a predetermined distance from the corner at which the second blade portion 325 meets the outer guide 323.

The protruding portion 326 may extend from one side of the first blade portion 324 in the shaft direction. As illustrated in FIG. 4, the protruding portion 326 may extend from an upper surface 324b of the first blade portion 324.

Referring to FIG. 5, a width W2 of the protruding portion 326 may be less than a width W1 of the first blade portion 324 in the radial direction. In this case, the protruding portion 326 may be disposed at a central portion of the first blade portion 324 in consideration of a start line and an end line of the first coil 330a. In this case, the width W1 of the first blade portion 324 may be referred to as a first width, and the width W2 of the protruding portion 326 may be referred to as a second width.

Referring to FIGS. 5, 6A, and 6B, a length L of the protruding portion 326 may be greater than a distance D3 between the first blade portion 324 and the second blade portion 325. In this case, the distance D3 between the first blade portion 324 and the second blade portion 325 may be referred to as a third separation distance.

FIG. 8 is a front view illustrating an example of a state in which the protruding portion of the insulator is coupled to the second blade portion in the motor according to the embodiment, FIG. 9 is a front view illustrating another example of a state in which the protruding portion of the insulator is coupled to the second blade portion in the motor according to the embodiment, FIG. 10 is a front view illustrating still another example of a state in which the protruding portion of the insulator is coupled to the second blade portion in the motor according to the embodiment. In this case, FIG. 8 shows a case in which the height of the blade portion is less than the height H1 of the first body portion 321. In addition, FIG. 9 shows a case in which the height of the blade portion is the same as the height H1 of the first body portion 321. In addition, FIG. 10 shows a case in which the height of the blade portion is greater than the height H1 of the first body portion 321.

Accordingly, referring to FIGS. 8 and 10, the height of the blade portion may be less than, greater than, or equal to the height H1 of the first body portion 321.

However, as illustrated in FIG. 10, in the case in which the height of the blade portion is greater than the height H1 of the first body portion 321, the length L of the protruding portion 326 is less than those in the other cases.

Referring to FIGS. 5 and 8 to 10, the length L of the protruding portion 326 may be the sum of the width W3 of the first body portion 321 and an outer diameter of the first coil 330a*K/cos(X°)*2. Here, X° may be an angle between the upper surface 324b of the first blade portion 324 and the protruding portion 326. In addition, a constant K is in the range of 1.4 to 1.6, and for example, the constant K may be 1.5.

The second groove may be formed in a direction perpendicular to the first groove formed in the blade portion. In this case, the number of the second grooves may be less than the number of the first grooves 324a formed in the first blade portion 324.

Referring to FIGS. 4 and 8, the protruding portion 326 may be easily bent due to a second-1 groove 328a and a second-2 groove 328b. As illustrated in FIGS. 4 and 8, an example in which two second-2 grooves 328b are provided is illustrated, but the second-2 groove 328b is not necessarily limited thereto. For example, one or three or more second-2 grooves 328b may also be provided in consideration of bending of the protruding portion 326.

Referring to FIG. 4, the second-1 groove 328a may be formed in a region in which the first blade portion 324 meets the protruding portion 326 in the radial direction.

Referring to FIG. 4, the second-2 groove 328b may be formed in an inner surface of the protruding portion 326 in a width direction of the protruding portion 326 (in the radial direction). Accordingly, the second-2 groove 328b may be disposed to be spaced apart from the second-1 groove 328a by a predetermined separation distance D4. In this case, the separation distance D4 between the second-1 groove 328a and the second-2 groove 328b may be referred to as a fourth separation distance.

In addition, the separation distance D4 between the second-1 groove 328a and the second-2 groove 328b may be greater than the separation distance D1 between the first body portion 321 and the first blade portion 324. In this case, the separation distance D4 may be the separation distance D1*cos(X°). In this case, the separation distance D1 may be the outer diameter of the first coil 330a*K.

Two second-2 grooves 328b may be disposed to be spaced apart from each other in a longitudinal direction of the protruding portion 326 so that the protruding portion 326 may easily cover the first coil 330a. In this case, a distance between an end portion of the protruding portion 326 and another second-2 groove 328b may be the same as the separation distance D4.

In addition, two second-2 grooves 328b may be disposed to be spaced apart from each other by a predetermined separation distance D5. In this case, the separation distance D5 between the second-1 groove 328a and the second-2 groove 328b may be referred to as a fifth separation distance. Referring to FIG. 10, the fifth separation distance may be less than the width W3 of the first body portion.

The protruding portion 326 may include a first region 326a, a second region 326b, and a third region 326c, which are divided by two second-2 grooves 328b formed in the inner surface of the protruding portion 326.

In this case, the first region 326a may be a region between the second-1 groove 328a and the second-2 groove 328b, the second region 326b may be a region between the second-2 grooves 328b, and the third region 326c may be a region between the end portion of the protruding portion 326 and another second-2 groove 328b. In this case, the second region 326b may be disposed to overlap the first body portion 321 in the shaft direction. In this case, a distance between the first body portion 321 and the second region 326b in the shaft direction may be the same as the first separation distance D1.

Alternatively, the protruding portion 326 may include a first region 326a closest to the first blade portion 324, a third region 326c closest to the second blade portion 325, and a second region 326b disposed between the first region 326a and the third region 326c, which are divided by the plurality of second grooves. In this case, a length of the second region 326b in the circumferential direction may be less than a length of the first body portion 321 in the circumferential direction.

Meanwhile, fifth grooves 326d may be formed in an outer surface of the protruding portion 326. Referring to FIGS. 6A and 6B, the first grooves 324a of the first blade portion 324 may be connected to the fifth grooves 326d of the protruding portion 326. In addition, when the protruding portion 326 is coupled to the second blade portion 325, the fifth grooves 326d of the protruding portion 326 may be connected to the first grooves 325a formed in a side surface of the second blade portion 325.

In addition, the bent end portion of the protruding portion 326 may be coupled to an upper surface 325b of the second blade portion 325. In this case, the end portion of the protruding portion 326 may be in contact with and fixed to an upper portion of the second blade portion 325 through one of various methods such as a method of using an adhesive member, a method of fusing by heating, and the like.

Accordingly, the second coil 330b may be wound by as much as the width W2 of the protruding portion 326. Accordingly, a contact risk between the first coil 330a and the second coil 330b may be minimized. That is, the first coil 330a may not be physically connected to the second coil 330b.

FIG. 11 is a view illustrating a protrusion formed on the protruding portion of the insulator and a groove formed in the second blade portion in the motor according to the embodiment.

Referring to FIG. 11, protrusions 326e may be formed on the end portion of the protruding portion 326. In addition, grooves 325c may be formed in the upper surface 325b of the second blade portion 325. Accordingly, as the protrusions 326e are coupled to the grooves 325c, the protruding portion 326 is disposed at a predetermined position of the second blade portion 325.

The coil 330 may be wound around the insulator 320. In addition, when power is supplied to the coil 330, a rotational magnetic field may be generated.

The coil 330 may be divided into the first coil 330a wound around the first body portion 321 and the second coil 330b wound around the second body portion 327. Accordingly, in the motor 1, dual winding of the first coil 330a and the second coil 330b may be performed, and individual power may be applied to each of the coils 330a and 330b to improve stability of the motor 1.

FIGS. 12 to 15 are views illustrating a process of winding the coils around the insulator of the motor according to the embodiment. In this case, FIG. 12 is a view illustrating the first coil wound in a state in which the first blade portion and second blade portion are tilted, FIG. 13 is a view illustrating a state in which the first blade portion and the second blade portion are not tilted, FIG. 14 is a view illustrating a state in which the protruding portion is bent to form the second body, and FIG. 15 is a view illustrating the second coil wound around the second body.

Referring to FIG. 12, the insulator 320 is disposed on the stator core 310, and the first blade portion 324 and the second blade portion 325 are tilted. In this case, the first blade portion 324 and the second blade portion 325 are tilted in directions opposite to directions in which the first body portion 321 is disposed. Then, the first coil 330*a* is wound around the first body portion 321. In this case, a start line 330*a*-1 and an end line 330*a*-2 which are two end portions of the first coil 330*a* may be disposed to be exposed upward.

Referring to FIG. 13, in a state in which the first coil 330*a* is wound around the first body portion 321, the first blade portion 324 and the second blade portion 325 are tilted in directions opposite to directions of being tilted to enter the states of not being tilted.

Referring to FIG. 14, in the states of not being tilted, the protruding portion 326 is bent so that the end portion of the protruding portion 326 comes into contact with the second blade portion 325. Accordingly, the first blade portion 324, the second blade portion 325, and the protruding portion 326 may form the second body portion 327.

In this case, any one of the start line 330*a*-1 and the end line 330*a*-2 of the first coil 330*a* may be disposed between the protruding portion 326 and the outer guide 323 in the radial direction.

Referring to FIG. 15, the second coil 330*b* is wound around the second body portion 327. In this case, the width W2 of the protruding portion 326 is less than the width of the first body portion 321 in the radial direction, and when the second coil 330*b* is wound, the second coil 330*b* does not interfere with the end portions 330*a*-1 and 330*a*-2 of the first coil 330*a*. In this case, the start line 330*b*-1 and the end line 330*b*-2 which are two end portions of the second coil 330*b* may be disposed to be exposed upward.

In this case, the second coil 330*b* is disposed between the end portions 330*a*-1 and 330*a*-2 of the first coil 330*a* in the radial direction. Accordingly, the second coil 330*b* is disposed to overlap the first coil 330*a* in the shaft direction.

FIG. 16 is a view illustrating a case in which a winding direction of the first coil and a winding direction of the second coil are different in the motor according to the embodiment.

Referring to FIG. 16, a winding direction of the first coil 330*a* wound around the first body portion 321 and a winding direction of the second coil 330*b* wound around the second body portion 327 may be different. For example, the first coil 330*a* may be wound in the counterclockwise direction, and the second coil 330*b* may be wound in the clockwise direction.

The start line 330*a*-1 and the end line 330*a*-2 of the first coil 330*a* may be disposed close to the first region 326*a* and the third region 326*c* to be spaced apart from each other in the radial direction.

In this case, the start line 330*a*-1 of the first coil 330*a* disposed between the first body portion 321 and the second blade portion 325 of the blade portion may be disposed at an outer side in the radial direction. As illustrated in FIG. 16, the start line 330*a*-1 of the first coil 330*a* may be disposed close to the outer guide 323.

The start line 330*b*-1 of the second coil 330*b* may be disposed to face the start line 330*a*-1 of the first coil 330*a* in the circumferential direction. In this case, the start line 330*b*-1 of the second coil 330*b* may be disposed close to the outer guide 323. Accordingly, a side of the start line 330*b*-1 of the second coil 330*b* may be disposed in the first groove 324*a* of the first blade portion 324. In this case, the term "close to" may denote being disposed to be in contact with or spaced a predetermined distance from the outer guide 323.

In addition, the end line 330*b*-2 of the second coil 330*b* may be disposed at an inner side in the radial direction. As illustrated in FIG. 16, the end line 330*b*-2 of the second coil 330*b* may be disposed close to the inner guide 322.

Accordingly, the number of turns of the first coil 330*a* wound around the first body portion 321 may be the same as the number of turns of the second coil 330*b* wound around the blade portion.

Meanwhile, since the coils 330 are divided into the first coil 330*a* wound around the first body portion 321 and the second coil 330*b* wound around the second body 321*b*, a dual winding structure may be implemented in the motor 1. In addition, the end portions 330*a*-1, 330*a*-2, 330*b*-1, and 330*b*-2 of the first coil 330*a* and the second coil 330*b* may be coupled to terminals (not shown) of the bus bar 600.

However, positions of the end portions 330*a*-1, 330*a*-2, 330*b*-1, and 330*b*-2 of the first coil 330*a* and the second coil 330*b* may be determined according to starting positions and the winding directions of the first coil 330*a* and the second coil 330*b*.

For example, in the first body portion 321, the positions of the end portions 330*a*-1 and 330*a*-2 of the first coil 330*a* are determined according to the starting position from which the winding is started and the winding direction of the first coil 330*a*. In addition, in the second body portion 327, the positions of the end portions 330*b*-1 and 330*b*-2 of the second coil 330*b* are determined according to the starting position from which winding is started and the winding direction of the second coil 330*b*. In this case, the positions of the end portions 330*a*-1, 330*a*-2, 330*b*-1, and 330*b*-2 may also be changed in consideration of a design structure of the bus bar 600.

The rotor 400 may be disposed inside the stator 300, and the shaft 500 may be coupled to a central portion of the rotor 400. In this case, the rotor 400 may be rotatably disposed inside the stator 300.

The rotor 400 may include a rotor core and magnets. The rotor core may be formed in a form in which a plurality of circular thin steel plates are stacked or in a single cylindrical form. A hole coupled to the shaft 500 may be formed in a central portion of the rotor core.

A protrusion configured to guide an arrangement of the magnets may protrude from an outer circumferential surface of the rotor core. In addition, the magnets may be attached to the outer circumferential surface of the rotor core. The plurality of magnets may be disposed along a circumference of the rotor core at predetermined intervals. In addition, the rotor 400 may also be formed in a type in which the magnets are inserted in pockets of the rotor core.

Accordingly, due to an electrical interaction between the coil 330 and the magnets, the rotor 400 rotates, and when the rotor 400 rotates, the shaft 500 is rotated to generate a driving force.

Meanwhile, the rotor 400 may further include a can member surrounding the magnets. The can member fixes the magnets to prevent the magnets from being separated from the rotor core. In addition, the can member may prevent the magnets from being exposed to the outside.

The shaft 500 may be disposed in the housing 100 to be rotatable due to the bearings 10.

The bus bar 600 may be disposed on the stator 300.

In addition, the bus bar 600 may be electrically connected to the first coil 330a and the second coil 330b of the stator 300.

The bus bar 600 may include a bus bar body and the plurality of terminals disposed in the bus bar body.

The bus bar body may be a mold product formed though an injection molding process.

Each of the terminals may be electrically connected to one of the end portions 330a-1 and 330a-2 of the first coil 330a or end portions 330b-1 and 330b-2 of the second coil 330b. In this case, the plurality of terminals may include phase terminals for a U-phase, a V-phase, and a W-phase, and a natural terminal.

In this case, the first coil 330a may include the start line and the end line. In addition, the second coil 330b may include the start line and the end line. In addition, each of the start lines and the end lines may be connected to one of the terminals. In this case, the start lines denote portions from which the winding of the coils 330a and 330b are started, and the end lines denote portions at which the winding of the coils 330a and 330b are ended.

The sensor portion 700 may detect a magnetic force of a sensing magnet installed to be rotatable in conjunction with the rotor 400 to check a present position of the rotor 400 so as to detect rotation of the shaft 500.

The sensor portion 700 may include a sensing magnet assembly 710 and a printed circuit board (PCB) 720.

The sensing magnet assembly 710 is coupled to the shaft 500 to be operated in conjunction with the rotor 400 to detect the position of the rotor 400. In this case, the sensing magnet assembly 710 may include sensing magnets and a sensing plate. The sensing magnets may be coaxially coupled to the sensing plate.

The sensing magnets may include main magnets disposed close to a hole forming an inner circumferential surface in the circumferential direction and sub-magnets disposed at an edge thereof. The main magnets may be disposed similarly to the drive magnets inserted into the rotor 400 of the motor. The sub-magnets are subdivided further when compared to the main magnets so that the number of poles of the sub-magnets is greater than the number of poles of the main magnets. Accordingly, a rotating angle may be more minutely divided and measured due to the sub-magnets, and the motor may be driven more smoothly.

The sensing plate may be formed of a metal material having a disc shape. The sensing magnets may be coupled to an upper surface of the sensing plate. In addition, the sensing plate may be coupled to the shaft 500. In this case, a hole through which the shaft 500 passes may be formed in the sensing plate.

A sensor configured to detect a magnetic force of the sensing magnet may be disposed on the PCB 720. In this case, a Hall integrated circuit (Hall IC) may be provided as the sensor. In addition, the sensor may detect a change in N-pole and S-pole of the sensing magnet 610 to generate a sensing signal.

While the present invention has been shown and described with reference to the exemplary embodiment thereof, it will be understood by those skilled in the art that various changes in form and details may be made herein without departing from the spirit and scope of the invention as defined by the appended claims.

REFERENCE NUMERALS

| | |
|---|---|
| 1: MOTOR | 100: HOUSING |
| 200: COVER | 300: STATOR |
| 310: STATOR CORE | 320: INSULATOR |
| 321: FIRST BODY PORTION | 322: INNER GUIDE |
| 323: OUTER GUIDE | 324: FIRST BLADE PORTION |
| 325: SECOND BLADE PORTION | 326: PROTRUDING PORTION |
| 327: SECOND BODY PORTION | 330: COIL |
| 330a: FIRST COIL | 330b: SECOND COIL |
| 400: ROTOR | 500: SHAFT |
| 600: BUS BAR | 700: SENSOR PORTION |

The invention claimed is:

1. A motor comprising:
a housing;
a stator disposed in the housing;
a rotor disposed in the stator; and
a shaft coupled to the rotor,
wherein the stator includes a stator core, an insulator disposed on the stator core, and a coil wound around the insulator,
the insulator includes a body portion, a guide portion coupled to the body portion, and a blade portion coupled to the guide portion,
the blade portion includes a first blade portion and a second blade portion of which one or more portions are spaced apart from the body portion and a protruding portion extending from the first blade portion, and
a width of the protruding portion is less than a width of the first blade portion,
wherein the coil includes:
a first coil disposed between the body portion and the blade portion; and
a second coil disposed on the first blade portion, the second blade portion, and the protruding portion.

2. The motor of claim 1, wherein the blade portion includes a plurality of first grooves in which the second coil is disposed.

3. The motor of claim 2, wherein the number of turns of the first coil wound around the body portion is the same as the number of turns of the second coil wound around the blade portion.

4. The motor of claim 2, wherein the protruding portion includes a plurality of second grooves formed in a direction perpendicular to the first grooves of the blade portion.

5. The motor of claim 4, wherein the number of the second grooves formed in the protruding portion of the blade portion is less than the number of the first grooves formed in the first blade portion.

6. The motor of claim 4, wherein:
the protruding portion includes a first region closest to the first blade portion, a third region closest to the second blade portion, and a second region disposed between the first region and the third region, which are divided by the plurality of second grooves; and
a length of the second region in a circumferential direction is less than a length of the body portion in the circumferential direction.

7. The motor of claim 6, wherein:
each of the first coil and the second coil includes a start line from which winding is started and an end line at which the winding is ended; and
the start line and the end line of the first coil are disposed close to the first region and the third region to be spaced apart from each other in a radial direction.

8. The motor of claim 7, wherein:
the start line of the first coil disposed between the body portion and the second blade portion is disposed at an outer side in the radial direction; and
the end line of the second coil disposed on the second blade portion is disposed at an inner side in the radial direction.

9. The motor of claim 1, wherein:
the first blade portion and the second blade portion are disposed opposite to each other; and
the body portion is disposed between the first blade portion and the second blade portion which are disposed to be spaced apart from each other.

10. The motor of claim 1, wherein a height of the first blade portion and a height of the second blade portion are greater than a height of the body portion.

11. The motor of claim 10, wherein a length of the protruding portion is greater than a distance between the first blade portion and the second blade portion.

12. The motor of claim 1, wherein the body portion, the guide portion, and the blade portion are integrally formed.

13. The motor of claim 12, wherein:
the guide portion includes an outer guide extending from an outer side of the body portion in a vertical direction; and
the blade portion extends from an inner surface of the outer guide in a direction perpendicular to the outer guide.

14. The motor of claim 1, wherein the first coil is not physically connected to the second coil.

15. A motor comprising:
a housing;
a stator disposed in the housing;
a rotor disposed in the stator; and
a shaft coupled to the rotor,
wherein the stator includes a stator core, an insulator disposed on the stator core, and a coil wound around the insulator, and
the insulator includes a first body portion, an inner guide protruding from an inner side of the first body portion, an outer guide protruding from an outer side of the first body portion, a first blade portion disposed to be spaced apart from one side of the first body portion and protruding from the outer guide in a radial direction, a second blade portion disposed to be spaced apart from the other side of the first body portion and protruding from the outer guide in the radial direction, and a protruding portion extending from one side of the first blade portion in a shaft direction, wherein:
when the protruding portion is coupled to one side of the second blade portion in the shaft direction, the first blade portion, the second blade portion, and the protruding portion form a second body portion;
the coil includes a first coil and a second coil;
the first coil is wound around the first body portion; and
the second coil is wound around the second body portion.

16. The motor of claim 15, wherein:
the first coil includes a start line and an end line; and
one of the start line and the end line is disposed between the protruding portion and the outer guide.

17. The motor of claim 15, wherein the first coil is wound around the first body in a state in which the first blade portion and the second blade portion are tilted in directions opposite to directions toward the first body.

18. The motor of claim 15, wherein:
a start line of the first coil is disposed between the protruding portion and the outer guide; and
a start line of the second coil disposed in a first groove of the first blade portion is disposed close to the outer guide.

* * * * *